Sept. 21, 1965  J. G. MOSOVSKY ETAL  3,207,935
ELECTRIC MOTORS
Filed Feb. 15, 1961
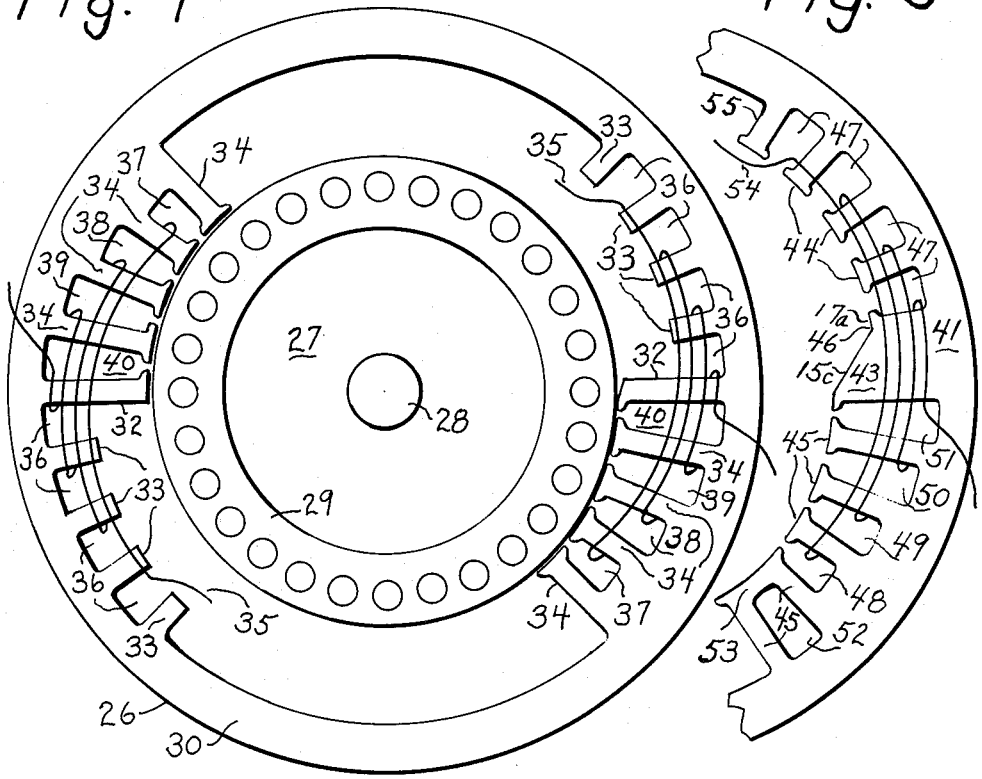
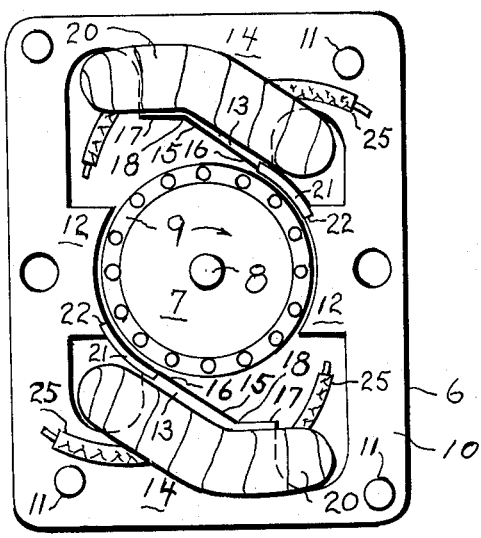
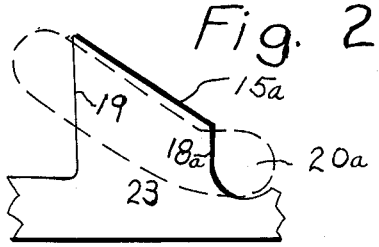
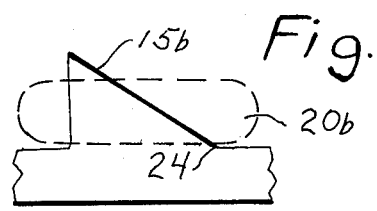
INVENTORS
Joseph G. Mosovsky
Charles N. Mosovsky United States Patent Office 3,207,935
Patented Sept. 21, 1965

3,207,935
ELECTRIC MOTORS
Joseph G. Mosovsky and Charles N. Mosovsky, both of
249 E. 2nd St., New York 9, N.Y.
Filed Feb. 15, 1961, Ser. No. 89,395
5 Claims. (Cl. 310—172)

The invention relates to electric motors and more particularly to the field poles and their exciting means.

In the prior art of constructing single-phase squirrel-cage induction motors, the practice has been to use the shaded pole variety for the very small fractional H.P. motors, and for the larger fractional H.P. motors, a distributed-winding with a plurality of teeth. Both types use some form of starting means that is unnecessary for continued running.

There have been invented single-winding squirrel-cage induction motors whose purpose it was to eliminate such starting means; which motors utilize some form of field pole distortion to render them self-starting such as concentrating the iron or the field-winding at one end of the field poles.

Although some date back a half-century for some reasons the industry has not accepted them.

In this invention, after considerable research we have evolved a novel polar field element in conjunction with the exciting means that is a great improvement over the prior art in the construction of single-winding squirrel-cage induction motors. The new approach is in the method of placing the exciting-winding in such a position in or around the field poles where it has more control of the shape of the magnetic flux, and the configuration of the iron field pole controls the distribution of the flux to the desired portion of the rotor, where it acts on the periphery of the rotor in a specific direction, imparting the necessary torque for improved operation.

It is an object of the invention to provide a single-winding squirrel-cage induction motor that will be self starting and possess a good starting and running torque.

Another object of the invention is to provide a motor with a high starting torque without the usual high starting current surge.

It is a further object of the invention to provide a motor that will have the combined features of the solid-pole concentrated-winding type motor and the distributed-winding type with a plurality of teeth, thus permitting a greater standardization of electric motors.

It is a still further object of the invention to provide an electric motor which will be cheap to construct and convenient to assemble, and which will be efficient and durable in operation.

Other objects and advantages of the invention will be apparent from the following description taken in conjunction with the accompanying drawings in which:

FIGURE 1 is an end view of a bi-polar solid-pole concentrated-winding motor embodying the invention with some of the structural parts not pertaining to the invention omitted.

FIGURES 2 and 3 are modifications in fragmentary of field poles that may be used in the motor of FIGURE 1.

FIG. 4 shows diagrammatically an end view of a distributed-winding type motor, having a plurality of teeth with some of the structural parts not pertaining to the invention omitted.

FIGURE 5 shows diagrammatically an end view in fragmentary of a composite field pole element of a solid-pole motor, and a motor of the distributed-winding type with a plurality of teeth, combined.

The invention is shown in the drawings embodied in a motor with; a solid-pole concentrated-winding; a distributed-winding type having a plurality of teeth; and a composite of the concentrated-winding type combined with the distributed-winding type of motor.

The novel principle of the invention being common to a variety of field-pole configurations so that a great many designs are possible and still remain in the scope of the invention and will be more specifically set forth in the appended claims.

First the solid-pole motor with a concentrated-winding will be described and in FIGURE 1 the stator member being generally designated by 6, and a rotor member 7.

The rotor member 7 includes a laminated core of the skewed type, mounted on shaft 8 and carrying a squirrel-cage winding 9.

The stator member 6 includes a laminated stator core built up of a plurality of laminations 10 secured together by rivets 11 or any suitable manner. The laminations 10, are each generally rectangular having two inwardly projecting oppositely disposed arcuate faced inter-pole pieces 12 which are approximately centered on a horizontal center line coinciding with the shaft 8. There are also two inwardly projecting wedge-shaped main filed poles 13 whose base 14 is approximately centered on a vertical center line coinciding with the shaft 8.

A novel feature of the wedge-shaped main field pole piece 13 is the inclined face part 15, whose function it is to direct the magnetic flux in a sharply defined line to a desired part of the rotor along the axial length thereof where it acts on the periphery of the rotor in a specific direction and even when motion is imparted to the rotor in the opposite direction to its inherent rotation, upon applying current the rotor brakes itself and then reverses its direction of rotation. Rotation is in the direction of the inclined face part 15, as indicated by the arrow.

The inclined face part 15 of the main field pole piece 13 has an angle such that at its most inward point 16 it comes in close proximity to the periphery of the rotor 7. The main field pole piece 13 has an integral shoulder part 17 disposed adjacent to the short side 18 of the field pole where the inward incline of the field pole begins; this permits a smaller overall pole size for a given angle of the inclined face part 15, and will be more clearly understood in the description of the field poles in FIGURES 2 and 3.

Although the rotor 7 derives its torque from the inclined face part 15 of the field pole 13, additional torque is obtained when the inclined face part 15 is dressed to a smooth finish and care should be taken when assembling the laminations 10 to align them so as to ease the smoothing operation.

A formed prewound exciting-coil 20 is placed around each of the main field pole pieces 13, and positioned so that the winding-turns of wire are substantially in the same plane as that of the inclined face part 15; in this unique position additional torque is obtained.

The inter-poles 12 are bridged only to the high side, that is the most inward point 16, of the main field poles 13 by connecting links 21; grooves 22 are provided to secure the links in position. By bridging the high side only of the main field poles 13 to the inter-poles, additional torque both for starting and running is obtained.

It should also be noted here that the motor performs better when a large diameter rotor of the skewed type is used.

In the drawing FIGURE 2 the field pole comprising a base 23 with a short side part 18a a long side part 19, and the inclined face part 15a, joining the two parts 18 and 19 together thereby permitting the exciting-coil 20 to be inclined but increasing the height substantially.

The field pole in FIGURE 3 can be used in the motor of FIGURE 1, thereby allowing the inward depth size of the polar projection to be reduced. Since the inclined face part 15b, raises from the very base 24 of the field pole and although it has the same torque characteristics as the field pole in FIGURE 1, it is difficult to incline the exciting-coil, but this form of the pole may be of some use where a restriction to size is important and the performance is secondary.

The field coils 20a and 20b in FIGURES 2 and 3 are shown in broken lines. The exciting-coil leads 25 are brought out externally so that the field poles may be connected to a suitable exciting source.

The preferred configuration of the field pole 13 in FIGURE 1 where an integral shoulder part 17, disposed adjacent to the short side part 18, maintains the same angle of the inclined face part 15, but reduces the overall height of the field pole. It should be noted here that the inclined face part 15, need not extend across the whole of the polar base element, its effective part, being, where it approaches close to the periphery of the rotor.

The term, solid-pole motor, as used in the specification does not imply that the field pole is a solid mass, but is used to distinguish it from the field pole element having a plurality of teeth.

The second method of applying the invention is in the embodiment of a motor with a distributed-winding and having a plurality of teeth as shown in the drawing of FIGURE 4; and wherein the bi-polar motor has a stator member 26 and a rotor member 27. The rotor member 27 includes a laminated core of the skewed type mounted on shaft 28, and carrying a squirrel-cage winding 29.

The stator member 26 includes a laminated stator core built up of a plurality of laminations 30 secured together in any suitable manner.

The laminations 30 are each generally circular with a plurality of inwardly projecting teeth grouped to form polar elements 31. The field pole elements 31 having a centrally located tooth 32, flanked on one of its sides by a group of short teeth 33 and on the other side by a group of long teeth 34. The winding 35 is wound starting at the centrally located tooth 32 with a maximum of turns that the winding-slots will permit so as to concentrate the flux, and then an adjoining short tooth 33, and a long tooth 34 are included until all the teeth in each field pole element have been wound as shown diagrammatically in FIGURE 4, the outer short tooth 33 is left unwound.

The winding-slots 36 between the short teeth 33 are all of the same depth, and deep enough to bury the windings. The winding-slots between the tall teeth 34 vary in depth, the most outer one 37 having the least depth, and 38, 39, and 40 respectively being progressively deeper.

The object being to incline the iron and the windings on one of the halves of each field pole element so that the magnetic flux is directed to the periphery of the rotor in such a manner as to give it a definite direction of rotation, while the short teeth 33, being at a greater distance from the rotor, act to suppress the magnetic flux so that it has little influence on the current that is induced into the rotor windings.

The motor of FIGURE 4 is drawn very close to full scale and from which good operating results were obtained; and it should be noted here again that a large diameter rotor of the skewed type should be used.

In the third version of the invention, the drawing in FIGURE 5 shows one field pole element of a bi-polar motor in which the field pole of a solid-pole concentrated-winding type motor of FIGURE 1 is combined with a field pole element of a distributed-winding type utilizing a plurality of teeth as shown in FIGURE 4.

In this novel design the field pole element 41 shown on a partial stator member 42 has a centrally located tooth 43 flanked on one of its sides by a group of short teeth 44 and on the other side by a group of tall teeth 45. The centrally located tooth 43 has a smooth surfaced inwardly inclined face part 15 and an integral shoulder part 17a disposed adjacent to the low side 46 of the inclined face part 15c. The group of short teeth 44 flank the shoulder part side 17a, of the centrally located tooth 43. The winding-slots 47 between the short teeth 44 are all of the same depth, but the winding-slots between the tall teeth 45 vary in depth. The most outer one 48 having the least depth and 49, 50, and 51 respectively, being greater in depth. The winding-slot 52 between the two outer tall teeth 45 is left unwound, being closed by an integral link 53 bridging the two tall teeth 45.

The winding 54 shown diagrammatically in FIGURE 5 is centered around the centrally located tooth 43 and then an adjoining short tooth 44 and a long tooth 45 are included until all the teeth have been wound, except tooth 55.

Having thus described our invention, what we claim as new and desire to secure by United States Letters Patent is:

1. An electric motor comprising:
   a rotor member;
   a stator member including a core, said stator member including two interpole pieces and two inwardly projecting main field poles, each of said main field poles including an inclined plane face wherein the angle of incline of said inclined plane face provides for direction of magnetic flux in a sharply defined line along the axial length of said rotor, said inclined plane face having a point thereof in close proximity to the periphery of said rotor and wherein said point defines a high point of said main field poles;
   an exciting coil placed around each of said main field poles;
   whereby the shape and distribution of magnetic flux to a desired portion of said rotor and the action of the flux on the periphery of said rotor in a specific direction imparts a starting torque on said rotor.

2. An electric motor as in claim 1 and wherein said exciting coil has the winding turns thereof positioned at substantially the same incline as the incline of said inclined plane face.

3. An electric motor as in claim 1 and wherein each of said main field poles includes a short side defined by the end of said inclined plane face opposite said high point, each of said main field poles including a shoulder portion disposed adjacent to said short side.

4. An electric motor as in claim 1 and wherein said rotor includes a shaft therewith, each of said main field poles including a base portion approximately centered on a center line coinciding with said shaft.

5. An electric motor as in claim 1 and wherein said inclined plane face includes a smooth dressed finish.

References Cited by the Examiner

UNITED STATES PATENTS

| 1,002,718 | 9/11 | Marelli | 310—172 |
| 1,401,996 | 1/22 | Lundell | 310—180 |
| 1,957,551 | 5/34 | Nierlich | 310—162 |
| 2,055,049 | 9/36 | Rall | 318—222 |
| 2,058,339 | 10/36 | Metzger | 310—193 |
| 2,100,809 | 11/37 | Lavocca | 310—172 |
| 2,185,990 | 1/40 | Schurch | 310—172 |
| 2,394,075 | 2/46 | Kimball | 310—193 |
| 2,968,755 | 1/61 | Baermann | 310—163 |

FOREIGN PATENTS

| 654,912 | 1/38 | Germany. |

OTHER REFERENCES

Theory and Calculation of Electrical Apparatus, Charles P. Steinmetz, McGraw-Hill Book Company, Incorporated, 1917, page 450.

MILTON O. HIRSHFIELD, *Primary Examiner.*